(12) United States Patent
Liao (10) Patent No.: US 7,467,690 B2
(45) Date of Patent: Dec. 23, 2008

(54) LUBRICATION DEVICE FOR BEARINGS AND OTHER MECHANICAL PARTS

(75) Inventor: Po-Lin Liao, Taichung (TW)

(73) Assignee: Lih Yann Industrial Co., Ltd., Taichung (TW)

( * ) Notice: Subject to any disclaimer, the term of this patent is extended or adjusted under 35 U.S.C. 154(b) by 405 days.

(21) Appl. No.: 11/189,708

(22) Filed: Jul. 27, 2005

(65) Prior Publication Data

US 2007/0034451 A1    Feb. 15, 2007

(51) Int. Cl.
*F16C 1/24* (2006.01)
(52) U.S. Cl. .................. 184/5.1; 184/105.1; 184/105.2
(58) Field of Classification Search .............. 184/105.1, 184/105.2
See application file for complete search history.

(56) References Cited

U.S. PATENT DOCUMENTS

| 1,515,240 | A | * | 11/1924 | Cox | 222/86 |
| 5,709,284 | A | * | 1/1998 | Shultz, Sr. | 184/5.1 |
| 5,782,318 | A | * | 7/1998 | Ng | 184/5.1 |
| 6,561,316 | B1 | * | 5/2003 | Graf et al. | 184/38.4 |
| 6,920,961 | B2 | * | 7/2005 | Ploeger | 184/105.1 |

* cited by examiner

*Primary Examiner*—Robert A. Siconolfi
*Assistant Examiner*—James K Hsiao
(74) *Attorney, Agent, or Firm*—Muncy, Geissler, Olds, Lowe PLLC (57) ABSTRACT

Disclosed is a pneumatic grease applicator includes a receptacle in which a retainer that retains a bearing to which grease is to be applied and a presser that securely holds the presser on the retainer are movably received. The receptacle has a bottom nozzle through which grease is continuously supplied from an external source under a pneumatically induced driving force, whereby the grease can be consecutively applied to a number of bearings without interrupts. Sealing members are provided between the retainer and the presser and side wall of the receptacle to prevent leakage of grease.

5 Claims, 9 Drawing Sheets

Fig 1

Prior Art

Fig 2

Prior Art

LUBRICATION DEVICE FOR BEARINGS AND OTHER MECHANICAL PARTS

BACKGROUND OF THE INVENTION

1. Field of the Invention

The present invention relates generally to a grease applicator that is employed to apply grease to mechanical elements, such as a bearing, and in particular to a pneumatically operated grease applicator in which grease is supplied and driven to cover over the bearing by pneumatic force.

2. The Related Art

Bearings are commonly employed in heavy machinery to support relative displacement and rotation between mechanical elements. Lubrication is one of the most important factors for maintaining operation and service life of the bearing. Lubrication of the bearing is commonly done by manually applying grease into and over the bearing. Workers apply the grease to the bearing by bear hands or hands with gloves. This often causes contamination of articles surrounding the working site or the dresses of the workers by being unexpected or accidentally contacted by the workers' hands.

Figure 1:
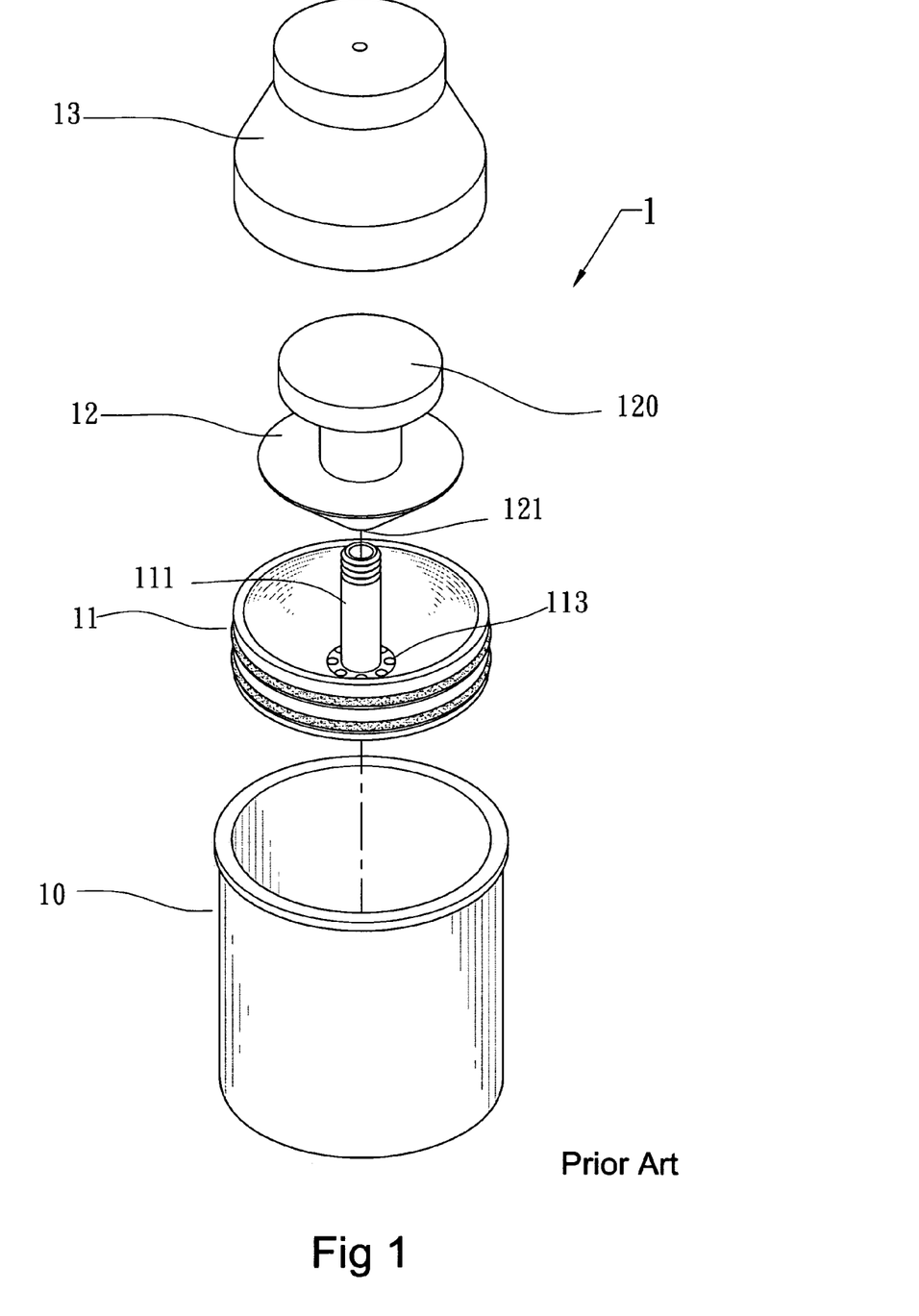
FIG. 1 is an exploded view showing a conventional grease applicator.
Figure 2:
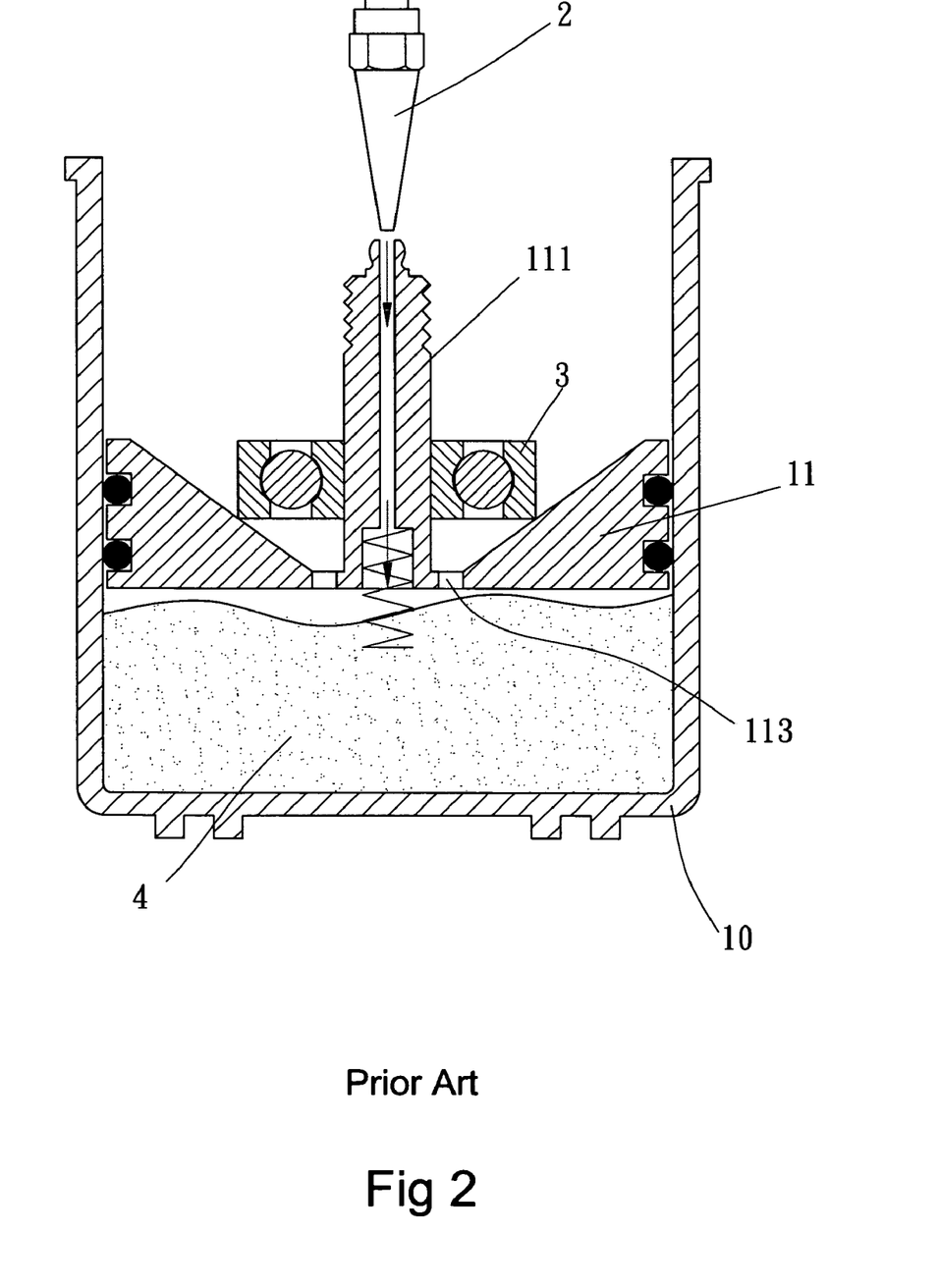
FIG. 2 is a cross-sectional view of the conventional grease applicator, together with a grease gun to illustrate feeding of grease into the grease applicator.
Figure 3:
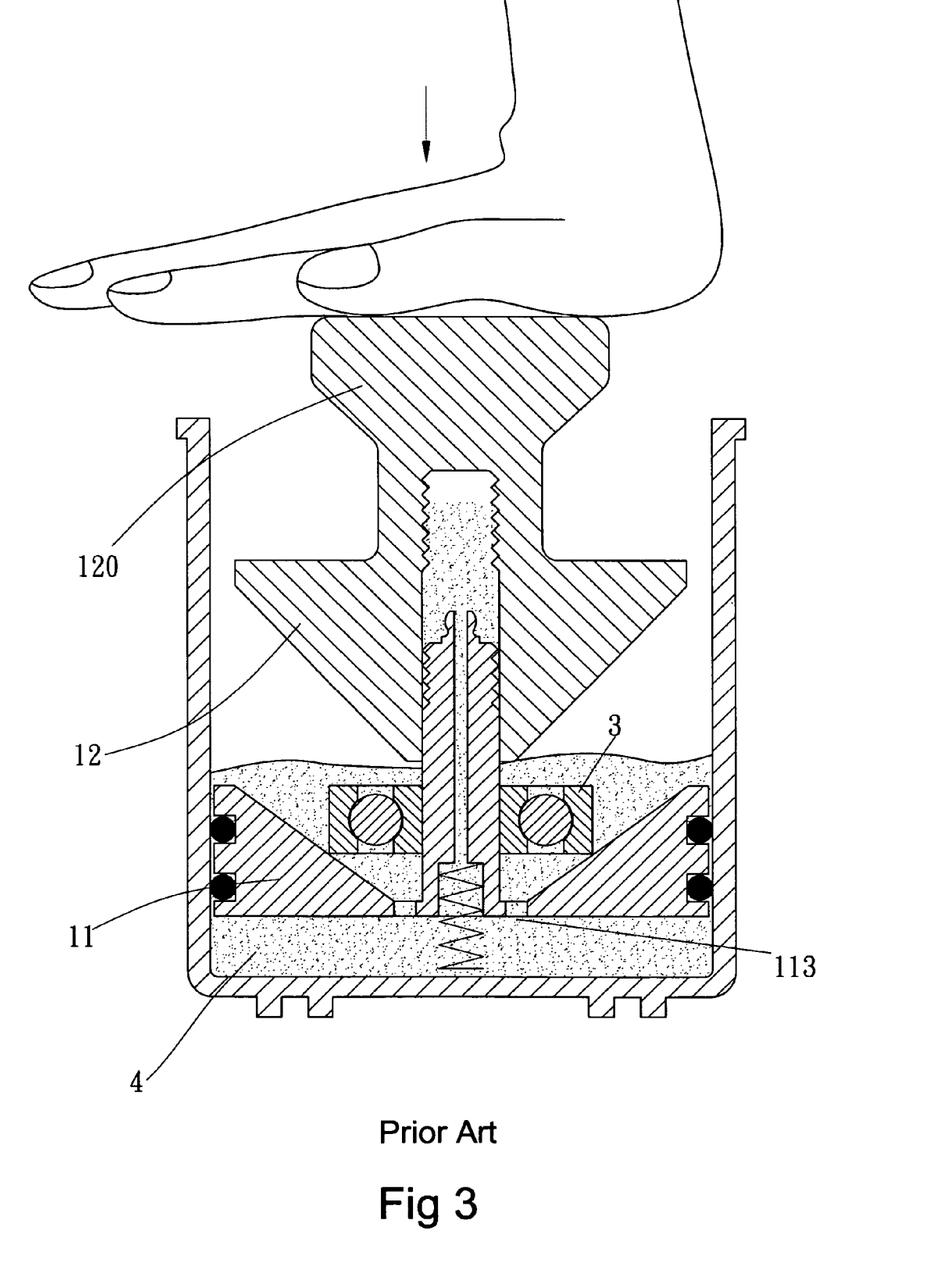
FIG. 3 is a cross-sectional view similar to FIG. 2 but showing the conventional grease applicator is operated with an operator's hand.

A grease applicator, as shown in FIGS. 1-3, is developed to solve the problem of contamination by the grease. This conventional grease applicator, which is broadly designated with reference numeral 1 in the drawings, comprises a receptacle 10 having a top opening (not labeled) through which a bearing retainer 11 is deposited into the receptacle 10 with a spring arranged therebetween to provide a biasing force. The grease retainer 11 has a top in which a truncated conic recess having a flat bottom is defined. An axle 111 extends from the bottom of the conic recess and is substantially concentric with respect to the conic recess. A bearing 3, on which grease is to be applied, is loosely fit over the axle and positioned in the conic recess. Through holes 113 are defined in the bottom of the conic recess and are in communication between upper and lower sides of the retainer 11. The axle 111 defines a bore through which grease is fed into the space inside the receptacle 10 below the retainer 11 by a grease gun 2.

A presser 12 has a central hole 121 removably fit over the axle 111 to allow for threading engagement between extending external thread formed on the axle 111 and internal thread formed inside the hole 121. This fixes the presser 12 to the axle 111. A hand pressing block 120 is formed on a top portion of the pressure 12 and is sized to project outside the receptacle 11 to receive a pressing force applied to the presser 12 by a hand positioned on the hand pressing block 120.

By applying a pressing force to the presser 12, the bearing retainer 11 is depressed deeply into the receptacle 10, which induces a pressure inside the grease. Thus, the grease is forced to pass through the holes 113 into the conic recess. Eventually, a sufficient amount of grease flows into the conic recess and floods over and fills into the bearing 3 positioned in the conic recess.

Further, a dustproof cover 13 is selectively positioned on the top opening to shield the receptacle 10 from dust.

Such a conventional device has several drawbacks:

(A) The operation of the device is based on the amount of grease fed into the receptacle 10, and such an amount is limited. Once the grease is consumed up, the operation of applying grease must be interrupted and the bearing and the bearing retainer removed in order to replenish grease into the receptacle. The retainer is then put back into the receptacle after the replenishment of grease. Such a removing and depositing-back process of the retainer is quite likely to cause undesired contamination both inside and outside the receptacle. Further, the requirement for frequent replenishment of grease makes it impossible to consecutively apply grease to a number of bearings.

(B) The axle 111 is mechanically weak, for the axle 111 is hollow for replenishment of grease into the receptacle 10. In addition, the axle 111 must bears the depressing force from the operator's hand. These two factors together make the axle 111 easily broken, shortening the service life of the grease applicator.

(C) Clearance or gap is present between the inside surface of the side wall of the receptacle 10 and the presser 12, which causes severe leakage of grease out of the receptacle. Substantial replenishment of grease is required during the operation of the grease applicator. This means a great waste of grease.

(D) The operator must continuously apply a pressure to the presser with his or her hand. This often causes fatigue of the operator's hand and lowers down the operation efficiency.

Thus, it is desired to have an improved grease applicator that overcomes the above discussed drawbacks of the conventional grease applicators.

SUMMARY OF THE INVENTION

An objective of the present invention is to provide a grease applicator that comprises a receptacle having a bottom opening or feeding channel through which grease is continuously fed into the receptacle by pneumatic means whereby continuous operation of the grease applicator to apply grease to a number of bearings can be done without undesired interrupt.

Another objective of the present invention is to provide a grease applicator that is pneumatically operable for both replenishing grease and applying grease to bearings whereby grease can be applied to the bearing in a uniform and effective manner.

A further objective of the present invention is to provide a grease applicator that does not comprises a hollow axle for replenishment of grease whereby the structure of the applicator is mechanically enhanced and the manufacturing process simplified.

A further objective of the present invention is to provide a grease applicator that comprises a grease containing receptacle into which grease is supplied through a channel defined in a bottom of the receptacle whereby there is no need to open the receptacle for replenishment of grease and thus undesired contamination caused by frequently opening the receptacle is avoided.

Yet a further objective of the present invention is to provide a grease applicator comprising a receptacle that is completely sealed against leakage of grease whereby contamination caused by grease is eliminated.

To realize the above objectives, in accordance with the present invention, there is provided a pneumatic grease applicator comprising a receptacle in which a retainer that retains a bearing to which grease is to be applied and a presser that securely holds the presser on the retainer are movably received. The receptacle has a bottom nozzle through which grease is continuously supplied from an external source under a pneumatically induced driving force, whereby the grease can be consecutively applied to a number of bearings without interrupts. Sealing members are provided between the retainer and the presser and side wall of the receptacle to prevent leakage of grease.

BRIEF DESCRIPTION OF THE DRAWINGS

The present invention will be apparent to those skilled in the art by reading the following description of a preferred embodiment thereof, with reference to the attached drawings, in which.

DETAILED DESCRIPTION OF THE PREFERRED EMBODIMENT

Figure 4:
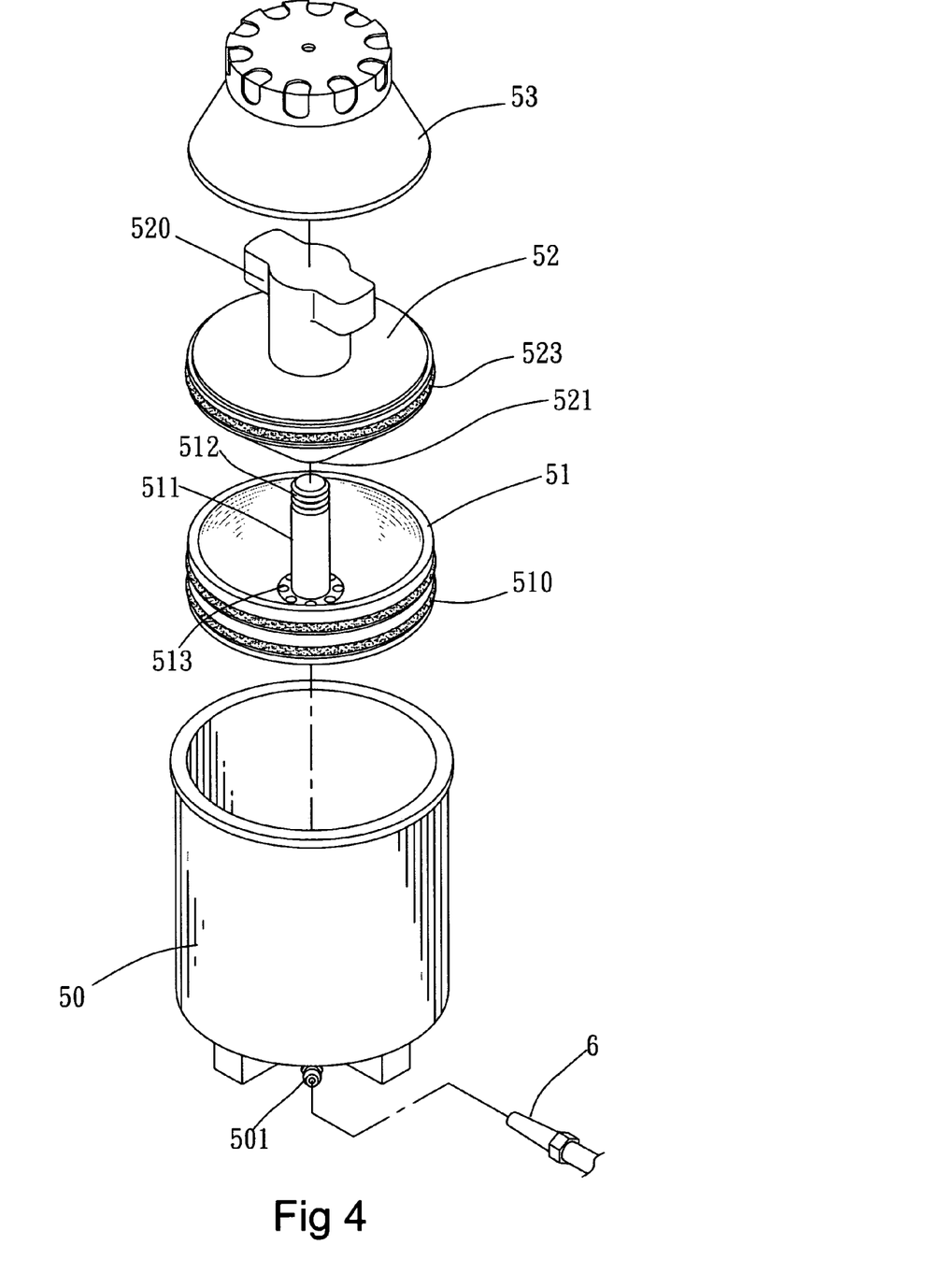
FIG. 4 is an exploded view of a pneumatic grease applicator constructed in accordance with the present invention.
Figure 5:
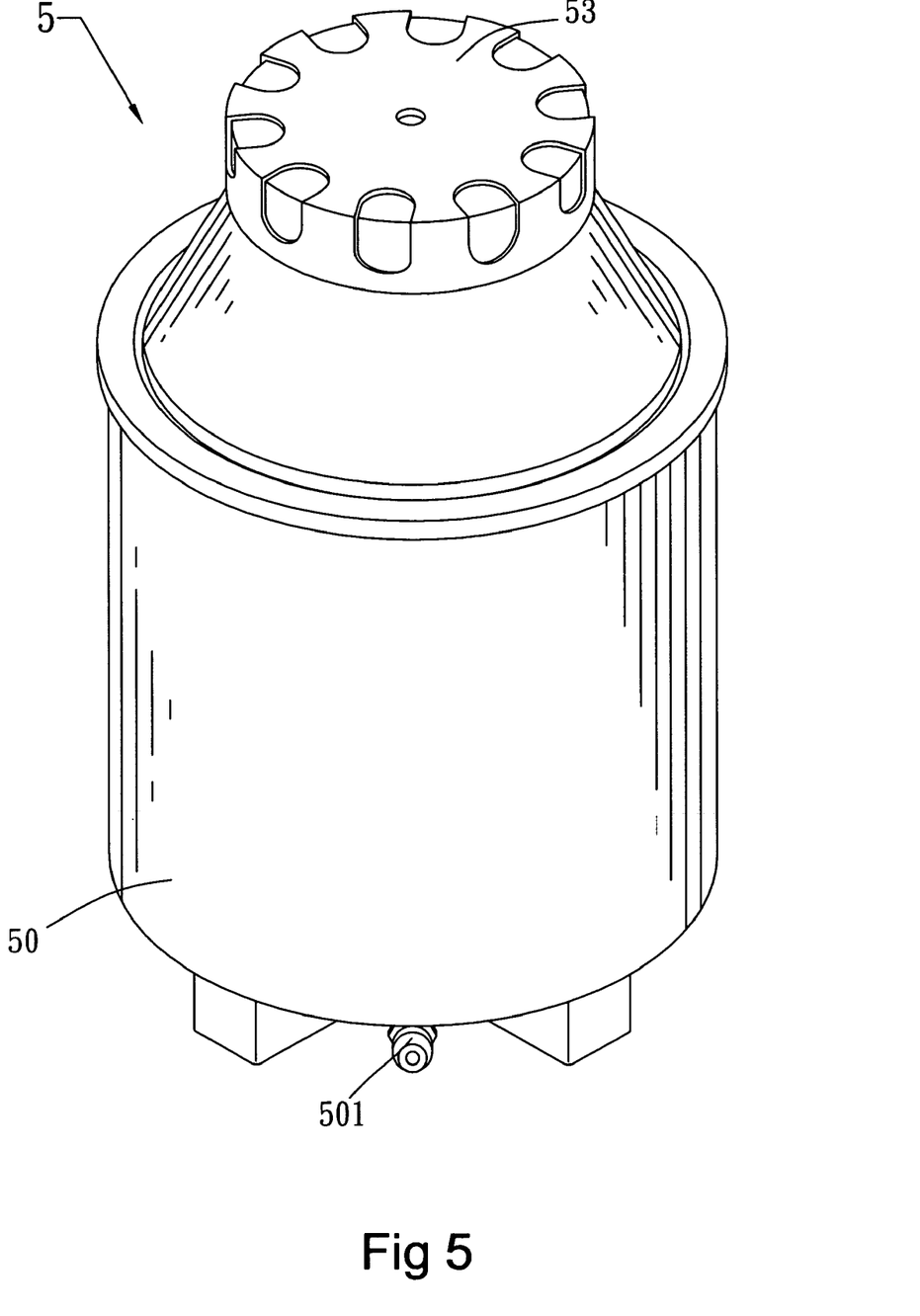
FIG. 5 is a perspective view of the pneumatic grease applicator of the present invention.
Figure 6:
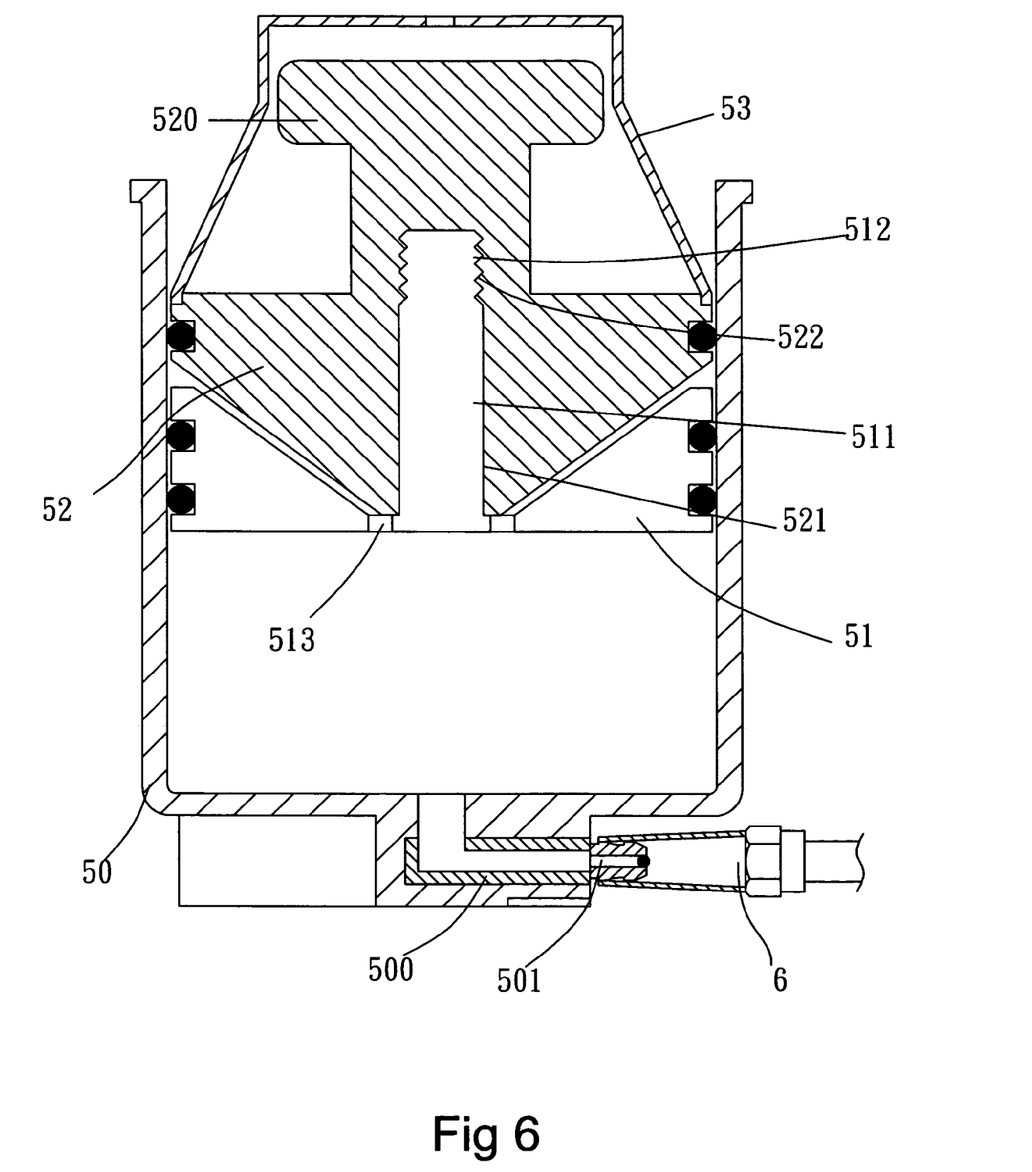
FIG. 6 is a cross-sectional view of the pneumatic grease applicator of the present invention.

With reference to the drawings and in particular to FIGS. 4-6, a pneumatic grease applicator constructed in accordance with the present invention, generally designated with reference numeral 5, comprises a grease receptacle 50, a bearing retainer 51, a presser 52, and dustproof cover 53. The receptacle 50 comprises a container having a top opening and a closed bottom. The bottom of the receptacle 50 defines an opening or channel 500 to which a nozzle 501 is mounted. The nozzle 501 is releasably engageable with a pneumatic grease gun 6, which supplies grease (which is indicated by reference numeral 4, and hatched, in FIGS. 8 and 9), under a pneumatically induced driving force, through the nozzle 501 into the receptacle 50.

The bearing retainer 51 is movably received in the receptacle 50 and has a bottom face opposing the closed bottom of the receptacle 50 to define therebetween a closed space into which grease from the grease gun 6 is fed. The retainer 51 also has an opposite top face in which a truncated conic recess (not labeled) having a flat central bottom is defined. An axle 511, which is solid for enhanced mechanical strength and durability, extends upward from the bottom of the recess. External threading 512 is formed on a top free end of the axle 511. A plurality of through holes 513, serving as grease passages, is defined in the bottom of the conic recess and surrounding the axle 511, preferably in an equally spaced manner. Sealing members 510 are mounted on a circumferential surface of the retainer 51 and form grease-tight engagement with inside surface of side wall of the receptacle 50 to eliminate leakage of grease through the clearance between the retainer 51 and the side wall of the receptacle 50.

The presser 52, which in the embodiment illustrated has a conic shape, which is inverted, corresponding in both location and size to the recess of the retainer 51 but is not necessary to be so, is received in the receptacle 50 above the retainer 51. The presser 52 defines a bore 521 movably fit over the axle 511. Internal threading 522 is formed inside the bore 521 to engage the external threading 512 of the axle 511 for securing the presser 52 to the retainer 51. At least one sealing member 523 is mounted to a circumferential surface of the presser 52 to form grease-tight engagement with the inside surface of the side wall of the receptacle 50 in order to prevent grease from leaking through the potential gap between the presser 52 and the side wall of the receptacle 50.

A hand holding section 520 extends upward from a top surface of the presser 52 for hand holding by an operator in the operation of the grease applicator 5.

Figure 7:
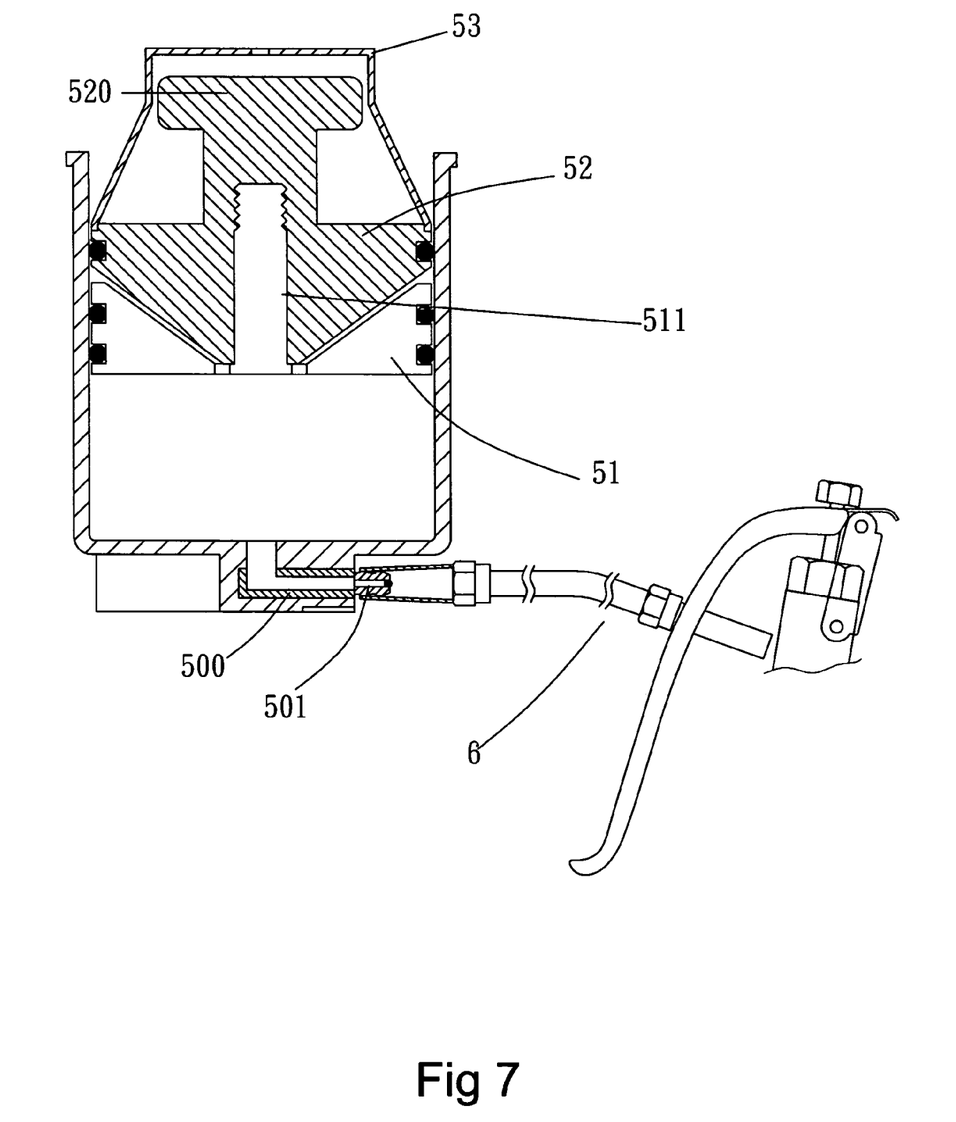
FIG. 7 is a cross-sectional view of the pneumatic grease applicator connected to a grease gun for replenishing grease into the grease applicator.
Figure 8:
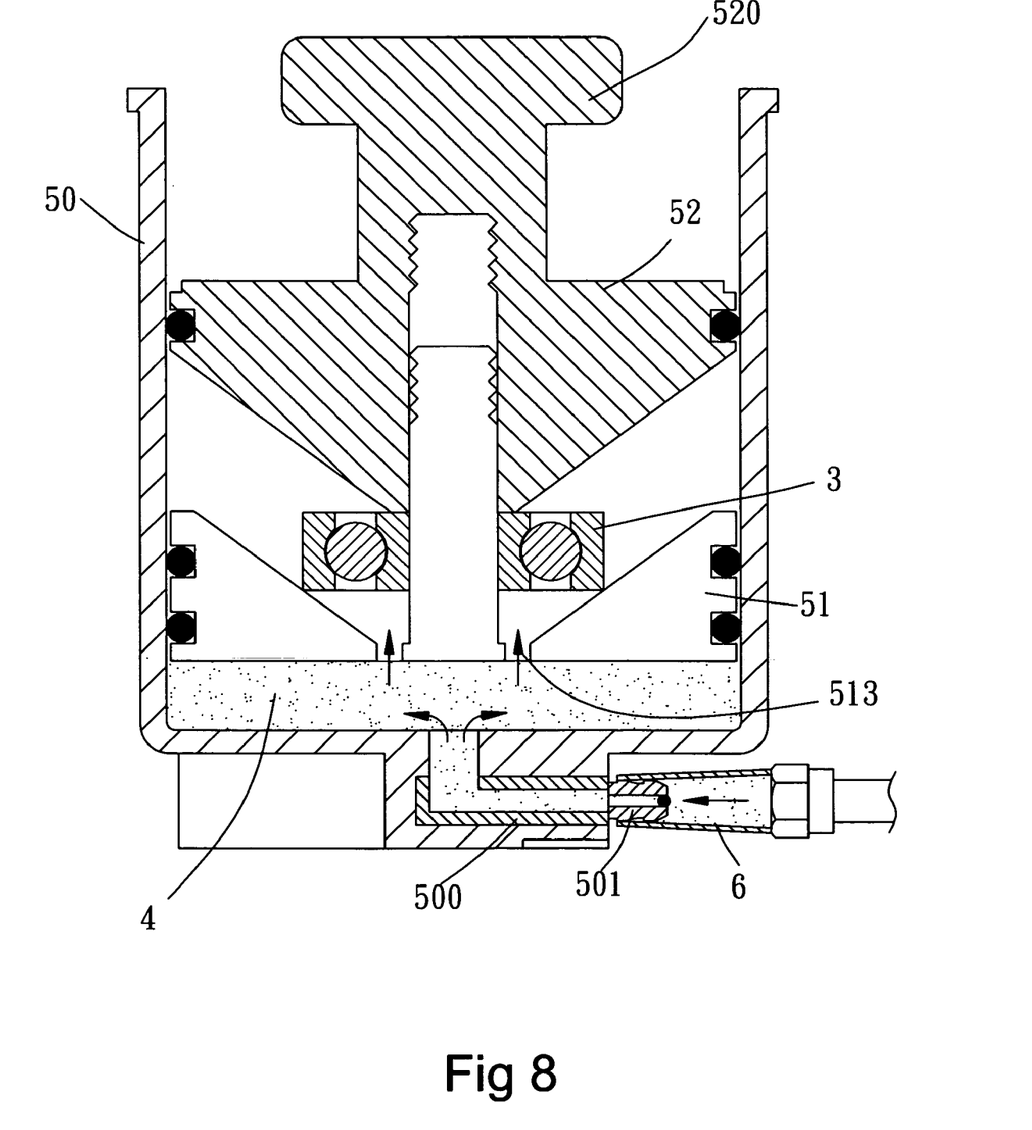
FIG. 8 is a cross-sectional view similar to FIG. 6, with arrows added to indicate grease flow in the operation of the grease applicator.
Figure 9:
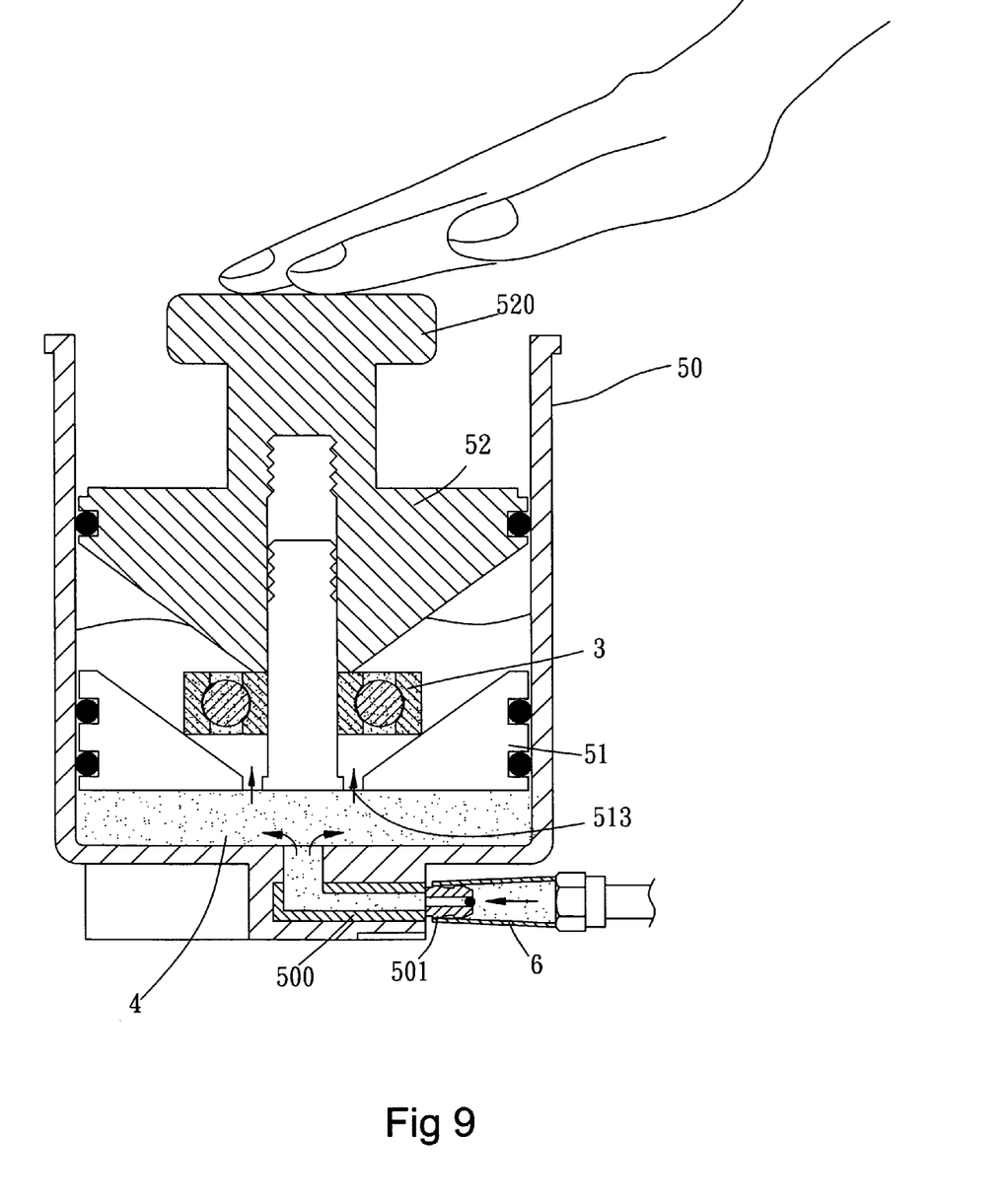
FIG. 9 is a cross-sectional view of the grease applicator illustrating the operation of the grease applicator by an operator's hand.

Also referring to FIGS. 7-9, to operate, with the presser 52 removed out of the receptacle 50, a bearing, which is labeled by reference numeral 3 in FIGS. 8 and 9, is fit over the axle 511 of the retainer 51 and is thus deposited into the receptacle 50 and received in the conic recess of the retainer 51. The presser 52 is put back into the receptacle 50 and threadingly fixed to the retainer 51 to securely retain the bearing 3 between the pressure 52 and the retainer 51, as shown in FIG. 8.

The nozzle 501 on the bottom of the receptacle 50 is connected to the pneumatic grease gun 6, as indicated in FIG. 7. Pressure is induced by the pneumatic grease gun 6 to forcibly feed grease 4 into the closed space between the retainer 51 and the bottom of the receptacle 50 as indicated by arrows of FIG. 8.

Once the closed spaced is filled with the grease 4, the same grease pressure continue to cause the grease to flow through the grease passages 513 and into the space between the retainer 51 and the presser 52 as shown in FIG. 9. Once the grease 4 fills up the space between the retainer 51 and the presser 52 to a predetermined extent, the bearing 3 is completely submerged in the grease 4 and is thus uniformly applied with the grease 4.

The hand holding section 520 of the presser 52 provides a measure for an operator to hand hold and thus maintain the presser 52 in position inside the receptacle 52 against a lifting force induced by the grease pressure.

The dustproof cover 53 is selectively and removably mounted to the top opening of the receptacle 50 to prevent dust and foreign objects from getting into and thus contaminating the interior of the receptacle 50.

Although the present invention has been described with reference to the preferred embodiment with reference to the drawings thereof, it is apparent to those skilled in the art that a variety of modifications and changes may be made without departing from the scope of the present invention which is intended to be defined by the appended claims.

What is claimed is:

1. A pneumatic grease applicator, comprising:
   a grease receptacle formed by a side wall having a top opening and a closed bottom;
   a bearing retainer movably received in the receptacle to from a first closed spaced with the bottom of the receptacle, the retainer having a top face forming a recess adapted to receive an object on which grease is to be applied, an axle formed in the recess and having a threaded end, grease passages being defined in the retainer and communicating between the recess and the first closed space, first sealing member being mounted on a circumference of the retainer to form grease tight engagement with the side wall of the receptacle;
   a presser movably received in the receptacle and forming a second closed space with the recess of the retainer, the presser defining a hole movably fit over the axle and forming internal threading to engage the threaded end of the axle for fixing the presser to the bearing to secure the object on which grease is to be applied between the presser and the retainer, second sealing member being mounted to a circumference of the presser to form grease tight engagement with the side wall of the receptacle; and a nozzle mounted to a channel defined in the bottom of the receptacle and in communication with the first space, the nozzle being adapted to connect with a pneumatically driven grease supply source to forcibly feed grease into the first space through the nozzle and the channel and to force the grease into the second space through the grease passages to flood over the object and thus applying grease to the object.

2. The pneumatic grease applicator as claimed in claim 1, wherein the presser comprises a hand holding section extending from a top face thereof.

3. The pneumatic grease applicator as claimed in claim 1 further comprising a dustproof cover selectively and removably mounted to the top opening of the receptacle.

4. The pneumatic grease applicator as claimed in claim 1, wherein the recess is of a truncated conic shape having a central flat bottom from which the axle extends, the grease passages being defined in the flat bottom and surrounding the axle.

5. The pneumatic grease applicator as claimed in claim 4, wherein the presser has an inverted conic shape corresponding in size to the recess of the retainer.

* * * * *